United States Patent [19]

Bouchard et al.

[11] Patent Number: 5,309,061
[45] Date of Patent: May 3, 1994

[54] COMPACT FLUORESCENT LAMP HAVING INCANDESCENT LAMP STARTING AID

[75] Inventors: Andre C. Bouchard; Scott M. Hardenstine, both of Peabody; Peter R. Gagnon, Topsfield, all of Mass.

[73] Assignee: GTE Products Corporation, Danvers, Mass.

[21] Appl. No.: 995,115

[22] Filed: Dec. 22, 1992

[51] Int. Cl.$^5$ .............................. H05B 41/36
[52] U.S. Cl. .......................... 315/47; 315/50; 315/117; 315/178; 315/322; 315/DIG. 5
[58] Field of Search ............ 315/46, 47, 50, 56, 315/58, 92, 93, 112, 113, 114, 115, 116, 117, 118, 178, 179, 180, 181, 182, 183, 322, DIG. 5, DIG. 7

[56] References Cited

U.S. PATENT DOCUMENTS

| | | | |
|---|---|---|---|
| 2,203,550 | 6/1940 | Spanner | 315/DIG. 5 X |
| 3,262,012 | 7/1966 | Koury et al. | 315/104 |
| 3,737,720 | 6/1973 | Willis, Jr. | 315/92 X |
| 3,878,416 | 4/1975 | Roche et al. | 313/3 |
| 4,091,307 | 5/1978 | McNamara, Jr. | 315/182 X |
| 4,268,780 | 5/1981 | Roche et al. | 315/179 |
| 4,350,930 | 9/1982 | Peil et al. | 315/49 |
| 4,894,585 | 1/1990 | Segoshi | 315/112 |
| 5,066,892 | 11/1991 | Bouchard et al. | 315/46 |

Primary Examiner—David Mis
Attorney, Agent, or Firm—Carlo S. Bessone

[57] ABSTRACT

A lamp assembly includes a tubular incandescent lamp located between the four tube sections of a double twin tube compact fluorescent lamp such that heat is transferred from the incandescent lamp to the fluorescent lamp when the incandescent lamp is energized. A power source provides power to the incandescent lamp and to the fluorescent lamp through a thermal switch. The thermal switch is in thermal contact with the incandescent lamp and the fluorescent lamp. When the lamp assembly is turned on, the switch applies power to the incandescent lamp initially. When the switch is heated by the incandescent lamp to a predetermined temperature, the switch deenergizes the incandescent lamp and applies power to the fluorescent lamp.

11 Claims, 1 Drawing Sheet 5,309,061

COMPACT FLUORESCENT LAMP HAVING INCANDESCENT LAMP STARTING AID

FIELD OF THE INVENTION

This invention relates to low pressure discharge lamps and, more particularly, to a starting aid for compact fluorescent lamps.

BACKGROUND OF THE INVENTION

In fluorescent lamps, ultraviolet (UV) radiation emitted by a mixture of mercury vapor and a noble gas is converted to visible light by a phosphor coating on the inside surface of a lamp envelope. The lamp envelope is sealed and contains mercury vapor at a few millitorr and an inert starting gas such as argon, krypton, neon, helium, or a mixture of these and other gases. A pair of electrodes located within the envelope emits electrons during starting and supplies electrical energy to an arc discharge during operation of the lamp. Electrical leads (inlead wires) coupled through the envelope to each of the electrodes supply electrical energy to the electrodes. A ballast inductor is commonly connected in series with the cathode electrode for limiting the current supplied to the lamp.

Compact fluorescent lamps are configured for mounting in a conventional incandescent lamp socket. Twin tube fluorescent lamps include two substantially parallel tube sections connected at one end. Electrodes are located at the other end of each tube section, and an arc is generated between the electrodes through the full length of each tube section. Double twin tube lamps comprise four substantially parallel tube sections, including two twin tube sections connected through a constriction. A continuous arc is generated between the electrodes through the four tube sections in these lamps.

A ballast inductor and a glow bottle are typically mounted in the base of a compact fluorescent lamp. The glow bottle is connected between the electrodes and acts as a thermal switch to aid in initiating a discharge. When the lamp is cold and is first turned on, current flows through the electrodes and through the glow bottle switch. The electrodes emit electrons which assist in initiating a discharge. After formation of the discharge, the glow bottle switch opens and remains open because there is insufficient voltage across the glow bottle to activate the same.

A recognized drawback of compact fluorescent lamps is the long starting time which may occur at low ambient temperatures. It is not uncommon for twin tube fluorescent lamps, particularly those with long tube sections, to flicker on and off for at least five minutes before sustaining a discharge. In fact, some lamps will continue to flicker and never sustain continuous light emission. It is known that repeated attempts at starting lamps shortens the life of the lamp. In addition, slow starting is unacceptable to users.

There have been many attempts at shortening the starting time of compact fluorescent lamps at low temperatures. Those skilled in the art will recognize that several factors affect the starting of fluorescent lamps. These factors include the following:

1. the arc length of the lamp;
2. the diameter of the lamp envelope;
3. the type of inert gas used and the gas pressure thereof;
4. the quantity of gas impurities;
5. the power supply voltage;
6. the characteristics of the glow bottle; and
7. the temperature of the mercury or ambient temperature.

Despite optimization of most of the above factors, lengthy starting times of compact fluorescent lamps remain a problem at low temperatures.

One approach to decreasing the starting time of compact fluorescent lamps at low temperatures involves using a smaller, higher resistance electrode. The aim is to increase electron emission of the coils of the lamp through the elevated electrode coil temperatures attainable with smaller electrodes. However, this approach has several drawbacks. Because the smaller electrodes have less capacity to carry emissive material coating than larger electrodes, a decrease in lamp life results. Further, the higher operating temperature of the small electrodes creates severe lamp envelope end blackening.

Another approach to increasing the mercury temperature inside compact fluorescent lamps prior to lamp starting involves the use of heater wires or pads which are attached to the lamp envelope. This approach also involves several drawbacks. In particular, the light output is attenuated by the heater wires or pads. In addition, difficulties are involved in manufacturing these lamps. Further, several minutes may still be required to heat the mercury inside the lamp when the lamp is turned on.

Accordingly, a general object of the present invention is to provide an improved compact fluorescent lamp.

Another object of the present invention is to provide a starting aid for compact fluorescent lamps to reduce the starting time of such lamps at low temperatures.

SUMMARY OF THE INVENTION

According to the present invention, these and other objects and advantages are achieved in a lamp assembly including a compact fluorescent lamp, an incandescent lamp located in close proximity to the fluorescent lamp, and a thermal switch in thermal contact with the incandescent lamp and the fluorescent lamp. The thermal switch applies power to the incandescent lamp initially when the lamp assembly is energized. The incandescent lamp supplies light immediately and also preheats the fluorescent lamp. When the thermal switch is heated to a predetermined temperature by the incandescent lamp, it deenergizes the incandescent lamp and applies power to the fluorescent lamp.

In a preferred embodiment of the present invention, the thermal switch comprises a bimetal switch, and the compact fluorescent lamp has a double twin tube configuration. In the preferred embodiment, the incandescent lamp is located between the four tube sections of the double twin tube lamp.

BRIEF DESCRIPTION OF THE DRAWINGS

For a better understanding of the present invention, together with other and further objects, advantages and capabilities thereof, reference is made to the accompanying drawings which are incorporated herein by reference and in which.

DETAILED DESCRIPTION OF THE INVENTION

The present invention involves an incandescent lamp positioned in close proximity to a compact fluorescent lamp. The incandescent lamp is turned on for a short period of time before starting the fluorescent lamp. The purpose of the incandescent lamp is two-fold. First, the incandescent lamp provides a source of light instantaneously when the lamp is turned on. Second, the incandescent lamp radiates sufficient energy to heat the mercury within the fluorescent lamp to aid in the rapid starting of the fluorescent lamp.

Figure 1:
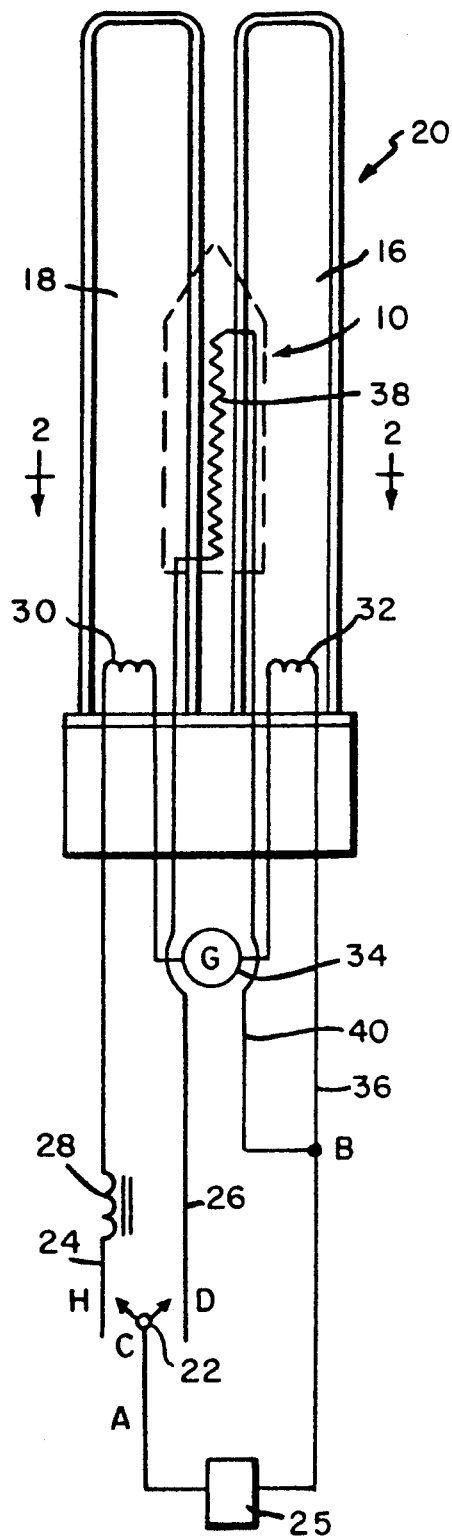
FIG. 1 is a schematic diagram of a compact fluorescent lamp assembly in accordance with the present invention.
Figure 2:
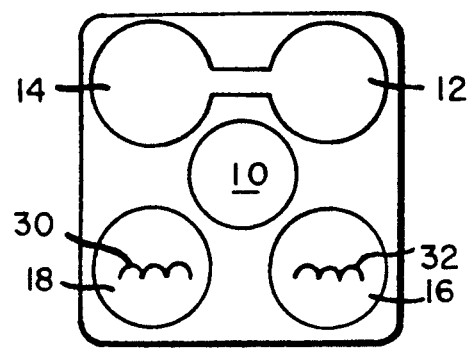
FIG. 2 is a cross-sectional view taken along line 2—2 of FIG. 1 showing the physical arrangement of the incandescent lamp within the double twin tube fluorescent lamp.

FIGS. 1 and 2 show a compact fluorescent lamp assembly in accordance with the invention. A tubular incandescent lamp 10 is mounted between the four tube sections 12, 14, 16 and 18 of a double twin tube fluorescent lamp 20. A typical double twin tube fluorescent lamp can accommodate a tubular incandescent lamp between the four tube sections thereof. FIG. 2 shows the position of the tubular incandescent lamp 10 with respect to the four tube sections 12, 14, 16 and 18 of the double twin tube fluorescent lamp 20.

A thermal switch 22 is used to apply power to the incandescent lamp 10 or to the fluorescent lamp 20. Thermal switch 22 is preferably a single pole, double throw switch. A supply voltage 25 is applied to leads A and B of the lamp assembly. Lead A is connected to terminal C of switch 22. A terminal H of switch 22 is connected via a lead 24 through a ballast 28 to one lead of an electrode 30 in fluorescent lamp 20. The other lead of electrode 30 is connected through a glow bottle 34 to one lead of an electrode 32. The electrodes 30 and 32 are located at opposite ends of fluorescent lamp 20. The other lead 36 of electrode 32 is connected to terminal B. Terminal D of switch 22 is connected to a lead 26 of incandescent lamp 10. A lead 40 of incandescent lamp 10 is connected to input terminal B. The leads 26 and 40 are connected to opposite ends of a filament 38 within incandescent lamp 10. The thermal switch 22 is positioned in close proximity to the incandescent lamp 10 and the fluorescent lamp 20. The glow bottle 34 and the ballast 28 are preferably mounted in a lamp base (not shown).

When the lamp is turned on, the power supply 25 applies a voltage, preferably 120 volts at 60 Hz, between input terminals A and B, and switch 22 is in position C-D. Power is supplied through switch 22 to incandescent lamp 10, which is thereby energized.

While it is on, incandescent lamp 10 radiates thermal energy, which heats the mercury within fluorescent lamp 20, and, at the same time, heats thermal switch 22. When switch 22 reaches a predetermined temperature (preferably at the same time or after the mercury has reached a temperature sufficient for rapid starting of the fluorescent lamp), switch 22 switches to position C-H. When switch 22 is in position C-H, incandescent lamp 10 is deenergized and power is supplied through the switch 22 and ballast 28 to fluorescent lamp 20. Thus, the incandescent lamp 10 shuts off and the fluorescent lamp 20 turns on when switch 22 switches from position C-D to position C-H. Operation of the glow bottle 34 is not affected by the incandescent lamp 10. That is, the glow bottle is not heated substantially by the incandescent lamp due to the fact that the incandescent lamp is energized for only for a short period of time and the glow bottle is located in the base of the lamp.

Figure 3:
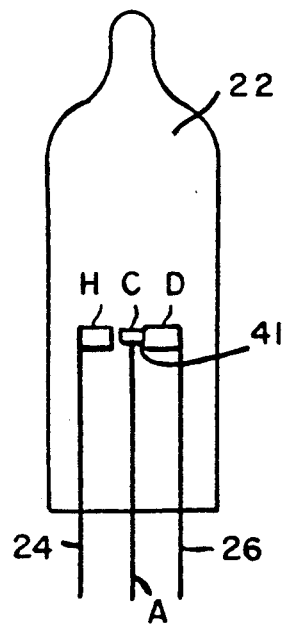
FIG. 3 shows an example of a thermal switch used in the lamp assembly of FIG. 1.

Switch 22 is preferably a snap action bimetal switch as shown in FIG. 3. Heat from the incandescent lamp 10 causes a snap action bimetal blade 41 to flex and break the circuit path C-D, while closing the circuit path C-H. The bimetal blade 41 is maintained in position C-H by heat from the operating fluorescent lamp. When the lamp is turned off, the switch cools, and the bimetal blade 41 automatically returns to position C-D. The bimetal switch 22 should be positioned in close proximity to the incandescent lamp 10 such that switch 22 switches to position C-H when the mercury within the fluorescent lamp 20 is sufficiently heated so that lamp 20 turns on rapidly when power is applied thereto.

The incandescent lamp 10 preferably has approximately the same light intensity a the fluorescent lamp 20. An example of a suitable fluorescent lamp and "starting aid" incandescent lamp includes the following. A 0.4 inch diameter by 1.5 inch long tungsten halogen lamp starting aid is mounted between the tube sections of a 13 watt double twin tube fluorescent lamp. A 35 watt, 120 volt tungsten halogen lamp yields approximately the same light output, or lumens, as the 13 watt compact fluorescent lamp, making it difficult for an observer to distinguish between the two lamp sources. The compact fluorescent lamp without the starting aid takes approximately 3-5 minutes to start at an ambient temperature of $-10°$ C., at 105 V mains, with the lamp blinking on and off repeatedly during the starting time. With aid of the tungsten halogen lamp, as soon as the switch 22 applies power, the fluorescent lamp turns on at an ambient temperature of about $-10°$ C. and a reduced line voltage of 105 V. Typically, the tungsten halogen lamp emits light for about 30 seconds, whereupon the switch 22 changes state and the fluorescent lamp is energized. The fluorescent lamp turns on within approximately 3 seconds at low ambient temperatures and reduced supply voltages.

Those skilled in the art will appreciate that the time required to heat the mercury inside the compact fluorescent lamp depends upon the starting aid lamp source wattage used and the ambient temperature, in addition to other variables. Accordingly, depending upon the characteristics of the lamps and the environment in which they are used, placement of the bimetal switch 22 and incandescent lamp 10 should be varied to suit the application.

While this invention is described with respect to a preferred embodiment in which an incandescent lamp is used as the starting aid for a double twin tube compact fluorescent lamp, an incandescent lamp could be used with other compact fluorescent lamp configurations, so long as the incandescent lamp is placed in close proximity to the fluorescent lamp. In particular, it is envisioned that an incandescent lamp could be placed within the lamp envelope of a tubular flourescent lamp.

While there have been shown and described what are at present considered the preferred embodiments of the present invention, it will be obvious to those skilled in the art that various changes and modifications may be made herein without departing from the scope of the invention as defined by the appended claims and equivalents thereto.

What is claimed is:

1. A fluorescent lamp assembly comprising:
   a fluorescent lamp;

an incandescent lamp located within or in close proximity to the fluorescent lamp; and a thermal switch, in thermal contact with the incandescent lamp and the fluorescent lamp, for applying power to the incandescent lamp initially when the lamp assembly is energized and, when the thermal switch is heated to a predetermined temperature by the incandescent lamp, deenergizing the incandescent lamp and applying power to the fluorescent lamp.

2. A lamp assembly as claimed in claim 1 wherein the thermal switch comprises a bimetal switch.

3. A lamp assembly as claimed in claim 1 wherein said incandescent lamp has approximately the same light output as the fluorescent lamp.

4. A compact fluorescent lamp assembly comprising:
a double twin tube compact fluorescent lamp having four tube sections;
an incandescent lamp located between the four tube sections; and
a thermal switch, in thermal contact with the incandescent lamp and the fluorescent lamp for applying power to the incandescent lamp initially when the lamp assembly is energized and, when the thermal switch is heated to a predetermined temperature by the incandescent lamp, deenergizing the incandescent lamp and applying power to the fluorescent lamp.

5. A lamp assembly as claimed in claim 4 wherein the thermal switch comprises a bimetal switch.

6. A lamp assembly as claimed in claim 4 wherein said incandescent lamp has approximately the same light output as the fluorescent lamp.

7. A lamp assembly as claimed in claim 6 wherein the incandescent lamp comprises a tungsten halogen lamp.

8. A compact fluorescent lamp assembly comprising:
a double twin tube compact fluorescent lamp having four tube sections;
an incandescent lamp located between the four tube sections; and
thermal switching means, in thermal contact with the incandescent lamp and the fluorescent lamp, for applying power to the incandescent lamp initially when the lamp assembly is energized and, when the thermal switching means is heated to a predetermined temperature by the incandescent lamp, deenergizing the incandescent lamp and applying power to the fluorescent lamp.

9. A lamp assembly as claimed in claim 8 wherein the thermal switching means comprises a bimetal switch.

10. A lamp assembly as claimed in claim 8 wherein said incandescent lamp has approximately the same light output as the fluorescent lamp.

11. A lamp assembly as claimed in claim 10 wherein the incandescent lamp comprises a tungsten halogen lamp.

* * * * *